US012126298B2

(12) United States Patent
Rothenhagen et al.

(10) Patent No.: US 12,126,298 B2
(45) Date of Patent: Oct. 22, 2024

(54) METHODS OF OPERATING DOUBLY-FED INDUCTION GENERATOR SYSTEMS

(71) Applicant: GE Energy Power Conversion Technology Limited, Warwickshire (GB)

(72) Inventors: Kai A. Rothenhagen, Berlin (DE); Aurelie Bocquel, Berlin (DE)

(73) Assignee: GE Energy Power Conversion Technology Limited, Warwickshire (GB)

( * ) Notice: Subject to any disclaimer, the term of this patent is extended or adjusted under 35 U.S.C. 154(b) by 232 days.

(21) Appl. No.: 17/617,214

(22) PCT Filed: Jun. 5, 2020

(86) PCT No.: PCT/EP2020/065663
§ 371 (c)(1),
(2) Date: Dec. 7, 2021

(87) PCT Pub. No.: WO2020/245385
PCT Pub. Date: Dec. 10, 2020

(65) Prior Publication Data
US 2022/0231622 A1 Jul. 21, 2022

(30) Foreign Application Priority Data
Jun. 7, 2019 (EP) .................................... 19179119

(51) Int. Cl.
*H02P 9/00* (2006.01)
*H02J 3/38* (2006.01)
(Continued)

(52) U.S. Cl.
CPC .............. *H02P 9/007* (2013.01); *H02J 3/388* (2020.01); *H02K 1/16* (2013.01); *H02K 3/28* (2013.01)

(58) Field of Classification Search
CPC ................................. H02P 9/007; H02J 3/388
See application file for complete search history.

(56) References Cited

U.S. PATENT DOCUMENTS

| 6,784,634 B2 * | 8/2004 | Sweo ...................... H02P 21/34 322/29 |
| 7,423,406 B2 * | 9/2008 | Geniusz .................. H02P 9/007 318/609 |

(Continued)

FOREIGN PATENT DOCUMENTS

EP    3748797 A1    12/2020

OTHER PUBLICATIONS

European Search Report from EP Appl. No. 19179119, mailed Dec. 11, 2019.

(Continued)

*Primary Examiner* — Rina I Duda
(74) *Attorney, Agent, or Firm* — Wood IP LLC; Theodore A. Wood

(57) ABSTRACT

A doubly-fed induction generator (DFIG) system is described. The DFIG system includes an induction electric machine including a stator having a stator winding and a rotor having a rotor winding. The stator winding is electrically connected to at least one output terminal and the rotor winding is electrically connected to the at least one output terminal by means of a power converter. The power converter includes a first active rectifier/inverter with alternating current AC terminals electrically connected to the rotor winding, and direct current DC terminals, and a second active rectifier/inverter with DC terminals electrically connected to the DC terminals of the first active rectifier/inverter by a DC link, and AC terminals electrically connected to the at least one output terminal. A controller is adapted to control the first active rectifier/inverter so that the (Continued)

frequency of the AC current at its AC terminals is substantially constant during at least one of a "line charging mode" and an "islanded mode".

18 Claims, 13 Drawing Sheets

(51) Int. Cl.
*H02K 1/16* (2006.01)
*H02K 3/28* (2006.01)

(56) References Cited

U.S. PATENT DOCUMENTS

| | | | | |
|---|---|---|---|---|
| 7,579,702 | B2 * | 8/2009 | Park | H02J 3/44 |
| | | | | 290/44 |
| 8,476,871 | B2 * | 7/2013 | Ooi | H02P 21/14 |
| | | | | 322/29 |
| 8,570,003 | B2 * | 10/2013 | Lu | H02P 9/10 |
| | | | | 318/599 |
| 9,859,787 | B2 * | 1/2018 | Wagoner | H02M 7/537 |
| 2007/0063677 | A1 * | 3/2007 | Schauder | H02P 23/08 |
| | | | | 322/29 |
| 2010/0114388 | A1 * | 5/2010 | Ooi | H02P 21/14 |
| | | | | 700/287 |
| 2012/0262129 | A1 * | 10/2012 | Lu | H02P 9/007 |
| | | | | 322/28 |
| 2013/0271056 | A1 | 10/2013 | Buente | |
| 2015/0349687 | A1 * | 12/2015 | Liang | H02P 9/007 |
| | | | | 322/61 |
| 2016/0177924 | A1 | 6/2016 | Xue | |
| 2017/0133971 | A1 * | 5/2017 | Huang | H02J 3/381 |
| 2017/0214335 | A1 * | 7/2017 | Basic | H02M 7/48 |
| 2018/0034264 | A1 * | 2/2018 | Wagoner | H02P 9/102 |

OTHER PUBLICATIONS

International Search Report and the Written Opinion of the International Searching Authority, or the Declaration from International Appl. No. PCT/EP2020/065663, mailed Sep. 18, 2020.

Farsani Pooyan Moradi et al., "Synchrophasor-Enabled Power Grid Restoration with DFIG-Based Wind Farms and VSC-HVDC Transmission System," IET Generation, Transmission & Distribution, IET, UK, vol. 12, No. 6, Mar. 27, 2018, pp. 1339-1345.

K.H. Youssef, et al., "A New Method for Voltage and Frequency Control of Stand-Alone Self-Excited Induction Generator Using PWM Converter with Variable DC Link Voltage," American Control Conference, 2008, IEEE, Jun. 11, 2008 (Jun. 11, 2008), pp. 2486-2491.

* cited by examiner

METHODS OF OPERATING DOUBLY-FED INDUCTION GENERATOR SYSTEMS

TECHNICAL FIELD

The present invention relates to methods of operating doubly-fed induction generator (DFIG) systems, and in particular when the DFIG system is used to charge an AC power line that forms part of a local AC power network and/or when the local AC power network is operated in an islanded mode before it is connected to a remote AC power network or utility grid by closing a remote circuit breaker, and for a short time thereafter.

BACKGROUND ART

DFIGs are well known induction electric machines that are often used for renewable power generation.

A typical DFIG includes a stator having a three-phase stator winding and a rotor having a three-phase rotor winding. Usually the stator winding is electrically connected to an alternating current (AC) power network or utility grid operating at a fixed frequency (the "grid frequency"), e.g., 50 or 60 Hz. The DFIG is an electric machine whose mechanical speed (i.e., the speed at which the rotor shaft rotates) may be varied by adjusting the frequency of the AC current fed into the rotor winding (the "rotor frequency"). In practice, this means that the rotor frequency and the grid frequency are often different.

A DFIG system may include the DFIG (i.e., the induction electric machine) and associated power converter, controller etc. The DFIG system may include output terminals (e.g., three terminals for a three-phase output) that may be electrically connected to the AC power network or utility grid by an external AC circuit. The external AC circuit is typically a three-phase circuit and may include a step-up transformer and circuit breaker. The circuit breaker is normally on the high voltage (HV) side of the step-up transformer and may sometimes be referred to as an HV circuit breaker.

The stator winding is electrically connected to output terminals of the DFIG system.

The rotor winding is electrically connected to the output terminals of the DFIG system by means of slip rings and a power converter. The power converter includes a first active rectifier/inverter (or "machine-side converter") with AC terminals electrically connected to the rotor winding, and direct current (DC) terminals. The power converter also includes a second active rectifier/inverter (or "grid-side converter") with DC terminals electrically connected to the DC terminals of the machine-side converter by a DC link, and AC terminals electrically connected to the output of the DFIG system, optionally by means of a transformer.

For wind or hydro power generation, for example, the rotor shaft of the DFIG is mechanically connected to a turbine assembly with turbine blades that may be rotated by the wind or by water flow. The rotor shaft of the DFIG may be mechanically connected to the turbine assembly by means of a drive chain so that rotation of the turbine assembly causes the rotor shaft to rotate. The drive chain may include a gear box.

The stator winding is electrically connected to the output terminals of the DFIG system and in normal operation should provide three-phase AC power at the grid frequency.

The magnetic field created in the rotor of the DFIG is not static but rotates at a speed that is proportional to the rotor frequency. This means that the rotating magnetic field passing through the stator windings of the DFIG not only rotates in response to the physical rotation of the rotor, but also because of the rotational effect produced by the AC current fed into the rotor winding (the "rotor current"). Therefore, both the rotation speed of the rotor and the frequency of the rotor current determine the speed of the rotating magnetic field passing through the stator winding, and consequently the frequency of the AC current induced in the stator winding (the "stator frequency" and the "stator current").

During normal operation, the stator frequency should be constant and equal to the grid frequency despite changes in the rotor speed—which will be caused by changes in wind speed or water flow speed, for example. This means that the rotor frequency must be continually adjusted to compensate.

The rotor winding is electrically connected to the output terminals of the DFIG system by means of the power converter. The machine-side converter may be controlled to set the electrical parameters of the rotor current, including the rotor frequency. To set these electrical parameters, the machine-side converter may use vector control, e.g., two-axis vector control in a rotating reference frame (e.g., a dq-reference frame) as explained in more detail below.

FIGS. 1 and 2 show a basic DFIG system 1 including a DFIG 2 whose rotor shaft is mechanically connected to a turbine assembly 4 by means of a drive train 6. The turbine assembly 4 includes a plurality of blades that may be rotated by the wind or by water flow for hydro power generation. The rotation speed of the turbine assembly 4 may be regulated by a turbine regulator (not shown). In the case of hydro power generation, the turbine regulator may control the rotation speed by opening and closing wicket gates that control the flow of water to the turbine assembly. For wind power generation, the corresponding turbine regulator may control the rotation speed of the wind turbine assembly by pitch control of the blades, for example.

The stator winding of the DFIG 2 is electrically connected to output terminals 8 by a three-phase AC circuit 10.

The output terminals 8 of the DFIG 2 are electrically connected to a remote three-phase AC power network or utility grid 20 (hereinafter "remote power network") by means of an external three-phase AC circuit that includes an AC power line 12, an HV circuit breaker 14 and a step-up transformer 16. In FIG. 1, the AC power line 12 is shown electrically connected to a remote switchyard 18 which is electrically connected in turn to the remote grid 20 by means of a remote circuit breaker 22. Both the HV circuit breaker 14 and the remote circuit breaker 22 are closed. The external three-phase AC circuit forms part of a local three-phase AC power network (hereinafter "local power network") to which the DFIG system 1 is electrically connected. In FIGS. 1 and 2, the local power network is shown to be electrically connected to the remote power network and is operating in a "grid-connected mode".

The rotor winding is electrically connected to a machine-side converter 24 by a three-phase AC circuit 26. A grid-side converter 28 is electrically connected to the machine-side converter 24 by a DC link 30 with one or more capacitors. The grid-side converter 28 is electrically connected to the output terminals 8 by a three-phase AC circuit 32 that includes a transformer 34. The grid-side converter, the remote switchyard and the remote power network have been omitted in FIG. 2 for clarity.

It will be understood that the DFIG 2 has a transfer ratio between the stator winding and the rotor winding which is typically not 1:1—much like a transformer. In order to consistently model and calculate DFIG behaviour, rotor values are normally referred to the stator and this is normally indicated by adding a dash or index to the value. All rotor values mentioned herein are referred to the stator, but without any special indication or marking.

The machine-side converter 24 includes a plurality of controllable semiconductor switches that are controlled to turn on and off for power conversion. Similarly, the grid-side converter 28 includes a plurality of controllable semiconductor switches that are controlled to turn on and off for power conversion.

With reference to FIG. 2, a controller 36A for the machine-side converter 24 includes a pulse pattern generator 38 for generating drive pulses for controlling the semiconductor switches of the machine-side converter to turn on and off. The drive pulses are generated using output signals from a direct axis (or "d-axis") current controller 40 and a quadrature axis (or "q-axis") current controller 42.

The controller 36A controls the machine-side converter 24 according to a known control scheme while the local power network is operating in the grid-connected mode.

The rotor current $I_r$ may be measured using suitable current transducers or other measuring devices and is converted from the three-phase reference frame to the dq-reference frame based on a transformation angle $\gamma_r$. The dq-reference frame is a rotating reference frame, typically rotating at the stator frequency of the DFIG 2. In the dq-reference frame, the measured value of the rotor current has a d-axis component (or "d-axis rotor current $I_{dr}$") and a q-axis component (or "q-axis rotor current $I_{qr}$").

The d-axis current controller 40 receives an input signal $\Delta I_d$ derived from a difference between a d-axis rotor current reference $I_{dr}^*$ and the d-axis rotor current $I_{dr}$ and provides a d-axis rotor voltage $V_{dr}$ that is converted from the dq-reference frame to the three-phase reference frame using the transformation angle $\gamma_r$. The q-axis current controller 42 receives an input signal $\Delta I_{qr}$ derived from a difference between a q-axis rotor current reference $I_{qr}^*$ and the q-axis rotor current $I_{qr}$ and provides a q-axis rotor voltage $V_{qr}$ that is converted from the dq-reference frame to the three-phase reference frame using the transformation angle $\gamma_r$.

The rotor current reference $I_{dr}^*$ may be provided by an active power, torque or speed controller, for example, and may be indicative of a desired active power, torque or speed for the DFIG 2. The d-axis rotor voltage $V_{dr}$ provided by the d-axis current controller 40 is used to control the semiconductor switches of the machine-side converter 24 to achieve the desired active power, torque or speed that corresponds to the current reference $I_{dr}^*$. The rotor current reference $I_{qr}^*$ may be provided by a reactive power, voltage or power factor controller, for example, and may be indicative of a desired reactive power, voltage or power factor for the DFIG 2. The q-axis rotor voltage $V_{qr}$ provided by the q-axis current controller 42 is used to control the semiconductor switches of the machine-side converter 24 to achieve the desired reactive power, voltage or power factor that corresponds to the current reference $I_{qr}^*$.

The d-axis current controller 40 and the q-axis current controller 42 can be proportional-integral (PI) controllers, for example.

The d-axis and q-axis rotor voltages $V_{dr}$, $V_{qr}$ derived by the d- and q-axis current controllers 40, 42 are converted from the dq-reference frame to the three-phase reference frame based on the transformation angle $\gamma_r$ and provided as an input to the pulse pattern generator 38.

In the known control scheme, the transformation angle $\gamma_r$ (or "rotor angle") used to convert between the three-phase and dq-reference frames is derived from the angle of the rotor shaft (the "mechanical angle") $\gamma_m$ and the angle of the stator voltage (the "stator angle") $\gamma_s$ as follows:

$$\gamma_r = \gamma_s - \gamma_m$$

The stator angle $\gamma_s$ corresponds to the integral of the stator angular frequency $\omega_s$ (i.e., $\gamma_s(t)=\text{INT}\{\omega_s\}dt$) and can be determined from the measured stator voltage using a phase-locked loop (PLL), for example.

The mechanical angle $\gamma_m$ corresponds to the integral of the rotor shaft speed $\omega_m$ (i.e., $\gamma_m(t)=\text{INT}\{\omega_m\}dt$) and may be determined using a suitable encoder or other measuring device within the DFIG.

The rotor angle $\gamma_r$ corresponds to the rotor angular frequency $\omega_r$ (i.e., $\gamma_r(t)=\text{INT}\{\omega_r\}dt=\text{INT}\{\omega_s-\omega_m\}dt$). It can therefore be seen that the rotor angular frequency $\omega_r$ is not normally substantially constant but will normally vary in response to changes in the rotor shaft speed, e.g., as a result of changing operation points.

The grid-side converter 28 may be controlled to set the electrical parameters of the grid current and may transfer active power between the machine-side converter and the AC power network or utility grid. The grid-side converter 28 may also be controlled to maintain the DC link voltage.

SUMMARY OF THE INVENTION

The present invention relates to a method of operating a doubly-fed induction generator (DFIG) system comprising an induction electric machine including a stator having a stator winding and a rotor having a rotor winding, wherein the stator winding is electrically connected to at least one output terminal and the rotor winding is electrically connected to the at least one output terminal of the DFIG system by means of a power converter that includes:
  a first active rectifier/inverter with alternating current AC terminals electrically connected to the rotor winding, and direct current DC terminals; and
  a second active rectifier/inverter with DC terminals electrically connected to the DC terminals of the first active rectifier/inverter by a DC link, and AC terminals electrically connected to the at least one output terminal;
wherein the method comprises the step of controlling the first active rectifier/inverter so that the frequency of the AC current at its AC terminals is kept substantially constant during at least one of a "line charging mode" and an "islanded mode", i.e., a substantially constant rotor frequency is maintained during one or both of these operating modes as herein defined so that the induction electric machine behaves like a synchronous electric machine.

Put another way, a substantially constant rotor frequency is imposed on the DFIG system so that the induction electric machine will behave like a synchronous electric machine, for example in regard to how it reacts in changes in grid frequency, drift etc. This also means that existing control strategies for synchronous electric machines may be used to control the induction electric machine in some circumstances.

The DFIG system will normally be electrically connected to, or form part of, a local three-phase AC power network (hereinafter "local power network") that includes an AC power line. The local power network may also include additional components such as a local circuit breaker, a step-up transformer etc. The local power network may be electrically connected to a remote three-phase AC power network or utility grid (hereinafter "remote power network") by means of a remote circuit breaker that is electrically connected to the AC power line.

When the remote circuit breaker is closed, the local power network is electrically connected to the remote power network and may be considered to be operated in a "grid-connected mode".

When the remote circuit breaker is open, the local power network is not electrically connected to the remote power network and may be considered to be operated in one of two different modes, namely:
- a "line charging mode" where the AC power line of the local power network is electrically connected to the DFIG system and is charged by the DFIG system, and
- an "islanded mode" where the AC power line has been charged by the DFIG system and the local power network is not yet electrically connected to the remote power network.

As described in more detail below, in the grid-connected mode, frequency and voltage regulation will typically be handled by the remote power network. Although in the islanded mode, other power sources may optionally be electrically connected to the local power network, these power sources will typically have a smaller rating than the DFIG system such that frequency and voltage regulation of the local power network will normally be determined by the DFIG system. Typically, the DFIG system will also have the largest effective inertia, and will therefore determine the frequency of the local power network.

As the local power network is transitioned through the various operating modes, the DFIG system will normally be operated in a corresponding sequence of steps, for example, from standstill to normal operation. The first active rectifier/inverter of the DFIG system may be controlled using different control schemes during these different steps.

The DFIG system will normally be operated according to the present method (i.e., to maintain a substantially constant rotor frequency) when the local power network is operated in the line charging mode or the islanded mode. The DFIG system may also be operated according to the present method for a short period of time immediately after the remote circuit breaker is closed to connect the local power network to the remote power network (i.e., when the local power network is operated in the grid-connected mode). After the remote circuit breaker is closed, the DFIG system will normally transition to normal operation, i.e., where the active rectifier/inverter is controlled using a known control scheme such as the control scheme described above with reference to FIG. 2, for example. More specifically, the first active rectifier/inverter will normally be controlled according to an appropriate control scheme during the operating steps of the DFIG system that correspond to the line charging, islanded and grid-connected modes of the local power network.

The frequency of the AC current at the AC terminals of the second active rectifier/inverter (i.e., the stator frequency) may vary during the at least one of the line charging mode and the islanded mode when the rotor frequency is kept substantially constant. The stator frequency may also vary during a grid-connected mode after the remote circuit breaker is closed and the local power network is electrically connected to the remote power network.

The step of controlling the first active rectifier/inverter may further comprise using a rotor angle as a transformation angle, e.g., to convert between a three-phase reference frame and a rotating reference frame.

The rotor angle may be derived by a rotor angle generator.

In one arrangement, the rotor angle generator may derive the rotor angle from a constant or substantially constant rotor frequency reference (e.g., a pre-set value or a value that is derived from a look-up table with reference to a pointer such as stator power, grid power, rotor shaft speed etc. during the operating mode(s)). The rotor angle may correspond to the integral of the rotor frequency reference (i.e., $\gamma_r = INT\{\omega_r^*\}dt$) as explained in more detail below, where $\gamma_r$ is the generated rotor angle and $\omega_r^*$ is the rotor frequency reference.

The rotor frequency reference is indicative of a desired rotor frequency that is to be maintained for the DFIG during the relevant operating mode(s).

It will be understood that the derived rotor angle will maintain a substantially constant rotor frequency.

In one arrangement, the rotor angle generator may derive the rotor angle using an algorithm as a function of stator power, grid power, rotor shaft speed etc. during the operating mode(s). It will be understood that the derived rotor angle will maintain a substantially constant rotor frequency. In one arrangement, the rotor angle generator may derive the rotor angle using a controller (e.g., a proportional-integral (PI) controller or other suitable controller). The controller may receive an input signal that is derived from a difference between a speed reference and a measured rotor shaft speed. The speed reference may be provided by a speed regulator that regulates the rotor shaft speed of the DFIG, e.g., a turbine regulator that may control the flow of water to a hydro turbine by opening or closing wicket gates, or the blade pitch in the case of a wind turbine. The output of the controller may be a dynamic rotor angle that may be added to a base rotor angle that is derived from the stator angle and the mechanical angle.

The first active rectifier/inverter may be controlled using vector control, e.g., two-axis vector control.

A controller for the first active rectifier/inverter may include a pulse pattern generator for generating drive pulses for controlling the semiconductor switches of the first active rectifier/inverter to turn on and off. The drive pulses may be generated using output signals from a first axis controller and a second axis controller. In one arrangement, one of the first axis controller and the second axis controller may be omitted or replaced with a pre-set value which may be zero. In one arrangement, where the rotating reference frame is a dq-reference frame, the first axis controller is a direct (or "d-axis") controller and the second axis controller is a quadrature (or "q-axis") controller.

The rotor current may be measured using suitable measuring devices and may be converted from the three-phase reference frame to the rotating reference frame (e.g., the dq-reference frame) based on the rotor angle that is derived by the rotor angle generator. The dq-reference frame is a rotating reference frame, typically rotating at the stator frequency of the DFIG. In the dq-reference frame, the measured rotor current has a d-axis component (the "d-axis rotor current") and a q-axis component (the "q-axis rotor current").

The first axis controller may receive an input signal derived from a difference between a rotor current reference and a measured rotor current in the rotating reference frame.

In one arrangement, the d-axis controller may receive an input signal derived from a difference between a d-axis rotor current reference and the d-axis rotor current. The second axis controller may receive an input signal derived from a difference between a rotor current reference and a measured rotor current in the rotating reference frame. In one arrangement, the q-axis controller may receive an input signal derived from a difference between a q-axis rotor current reference and the q-axis rotor current.

The rotor current reference and the measured rotor current for the first axis may be provided to a first summing node that subtracts the measured rotor current from the rotor current reference and provides the difference to the first axis controller. The rotor current reference and the measured rotor current for the second axis may be provided to a second summing node that subtracts the measured rotor current from the rotor current reference and provides the difference to the second axis controller.

The rotor current reference for the first axis controller may be indicative of a desired first parameter (e.g., active power, torque or speed) and the output signal from the first axis controller may control the semiconductor switches of the first active rectifier/inverter to achieve the desired level of the first parameter that corresponds to the rotor current reference for the first axis. The rotor current reference for the second axis controller may be indicative of a desired second parameter (e.g., reactive power, voltage or power factor) and the output signal from the second axis controller may be used to control the semiconductor switches of the first active rectifier/inverter to achieve the desired level of the second parameter that corresponds to the rotor current reference for the second axis.

The first axis controller may be a PI controller and the second axis controller may be a PI controller, for example.

The output signal from the first axis controller may be used to control active power of the DFIG and consequently the rotational speed, torque or stator active current. The output signal from the second axis controller may be used to control reactive power of the DFIG and consequently the stator voltage, stator reactive current, or stator power factor.

The rotor angle derived by the rotor angle generator may be used as a transformation angle for the controller when converting between the three-phase reference frame and the dq-reference frame. The output signals from the first axis controller and the second axis controller may be converted from the dq-reference frame to the three-phase reference frame using the rotor angle to derive control signals for the pulse pattern generator, for example.

The controller may include a stator angle generator that derives a stator angle from a measured value of the stator voltage using a phase-locked loop (PLL), for example. The stator current may be measured using suitable current transducers or other measuring devices and may be converted from the three-phase reference frame to the rotating reference frame (e.g., the dq-reference frame) based on the stator angle. In the dq-reference frame, the measured stator current has a d-axis component (the "d-axis stator current") and a q-axis component (the "q-axis stator current").

The input signals to the first axis controller and the second axis controller may be further derived from the measured stator current for the first axis and the second axis, respectively (i.e., the d-axis stator current and the q-axis stator current). In one arrangement, the first axis (i.e., d-axis) stator current may be provided to a first controller or gain function and the second axis (i.e., q-axis) stator current and the measured value of the stator voltage may be provided to a second controller or gain function. The output of the first controller or gain function may be provided to the first summing node and used to derive the input signal to the first axis controller and the output of the second controller or gain function may be provided to the second summing node and used to derive the input signal to the second axis controller. The first and second gain functions may be implemented as a constant gain value, a first order transfer function such as a low pass function, or a PID function, for example.

Using the stator current and stator voltage to derive the input signals for the first axis controller and second axis controller allows the controller to correctly align the rotating reference frame with the stator voltage. When using a substantially constant rotor frequency to derive a rotor angle as the transformation angle to convert between the three-phase and dq-reference frames, for example, this alignment might be lost in the case of loading the DFIG with active power. The relationship between stator current and rotor current in the case of correct alignment is explained in more detail below.

The present invention further provides a DFIG system comprising:
  an induction electric machine including a stator having a stator winding and a rotor having a rotor winding, wherein the stator winding is electrically connected to at least one output terminal of the DFIG system and the rotor winding is electrically connected to the at least one output terminal by means of a power converter that includes:
    a first active rectifier/inverter with alternating current AC terminals electrically connected to the rotor winding, and direct current DC terminals; and
    a second active rectifier/inverter with DC terminals electrically connected to the DC terminals of the first active rectifier/inverter by a DC link, and AC terminals electrically connected to the at least one output terminal; and
  a controller adapted to control the first active rectifier/inverter so that the frequency of the AC current at its AC terminals is kept substantially constant during at least one of a "line charging mode" and an "islanded mode".

The controller may be adapted to carry out the method described above.

The present invention further provides an alternative method of operating a DFIG system comprising an induction electric machine including a stator having a stator winding and a rotor having a rotor winding, wherein the stator winding is electrically connected to at least one output terminal and the rotor winding is electrically connected to the at least one output terminal of the DFIG system by means of a power converter that includes:
  a first active rectifier/inverter with alternating current AC terminals electrically connected to the rotor winding, and direct current DC terminals; and
  a second active rectifier/inverter with DC terminals electrically connected to the DC terminals of the first active rectifier/inverter by a DC link, and AC terminals electrically connected to the at least one output terminal;
wherein the method comprises the step of controlling the first active rectifier/inverter so that the frequency of the AC current at its AC terminals is determined with reference to the difference between a speed reference and a measured rotor shaft speed of the DFIG.

The present invention further provides an alternative DFIG system comprising:
  an induction electric machine including a stator having a stator winding and a rotor having a rotor winding, wherein the stator winding is electrically connected to at least one output terminal of the DFIG system and the rotor winding is electrically connected to the at least one output terminal by means of a power converter that includes:
a first active rectifier/inverter with alternating current AC terminals electrically connected to the rotor winding, and direct current DC terminals; and
a second active rectifier/inverter with DC terminals electrically connected to the DC terminals of the first active rectifier/inverter by a DC link, and AC terminals electrically connected to the at least one output terminal; and
a controller adapted to control the first active rectifier/inverter so that the frequency of the AC current at its AC terminals is determined with reference to the difference between a speed reference and a measured rotor shaft speed of the DFIG.

Further features of the alternative method and the alternative DFIG system are as herein described and with particular regard to the control scheme described with reference to FIG. 13 that may optionally be used during at least one of a "line charging mode" and a "islanded mode". In one arrangement, a rotor angle generator may derive a rotor angle that may be used as a transformation angle to convert between a rotating reference frame and a three-phase reference frame. In one arrangement, the rotor angle generator may derive the rotor angle using a controller (e.g., a proportional-integral (PI) controller or other suitable controller). The controller may receive an input signal that is derived from a difference between the speed reference and the measured rotor shaft speed of the DFIG. The speed reference may be provided by a speed regulator that regulates the rotor shaft speed of the DFIG, e.g., a turbine regulator that may control the flow of water to a hydro turbine by opening or closing wicket gates, or the blade pitch in the case of a wind turbine. The output of the controller may be a dynamic rotor angle that may be added to a base rotor angle that is derived from the stator angle and the mechanical angle.

A first axis (e.g., a q-axis) controller may receive an input signal derived from a difference between a rotor current reference and a measured rotor current. The measured rotor current may be an absolute value, for example. The output signal from the first axis controller may be converted from the dq-reference frame to the three-phase reference frame using the rotor angle to derive control signals for the pulse pattern generator.

DETAILED DESCRIPTION

Figure 3:
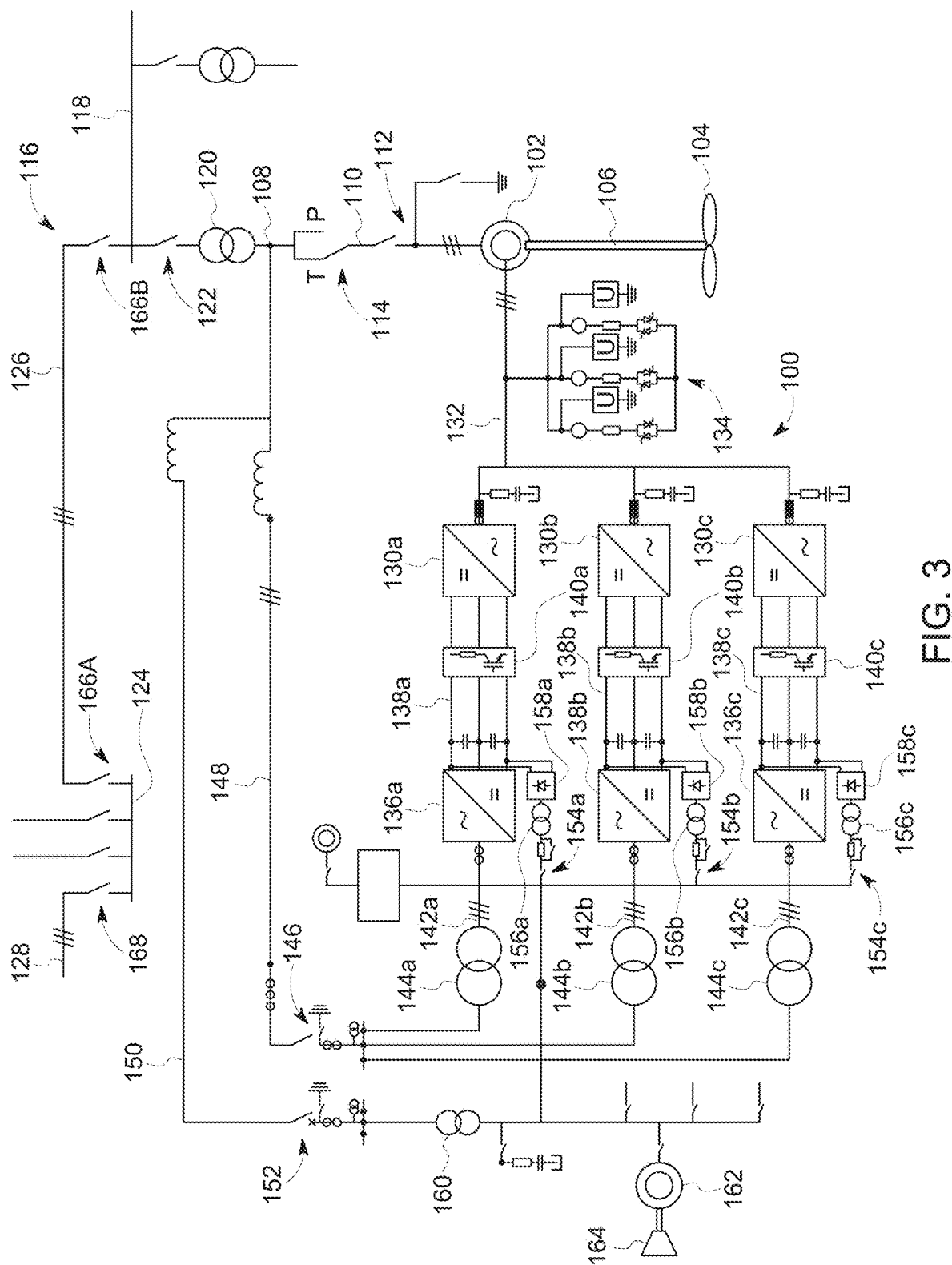
FIG. 3 is a schematic diagram of a possible practical implementation of a DFIG system according to the present invention.

FIG. 3 shows a possible practical implementation of a DFIG system 100 specifically adapted for hydro power generation. The DFIG system 100 includes a DFIG 102 whose rotor shaft is mechanically connected to a turbine assembly 104 by means of a drive train 106. The turbine assembly 104 includes a plurality of blades that may be rotated by water flow for hydro power generation. The rotation speed of the turbine assembly 104 is regulated by a turbine regulator (not shown) which controls the rotation speed by opening and closing wicket gates (not shown) that control the flow of water to the turbine assembly.

The stator winding of the DFIG 102 is electrically connected to output terminals 108 by a three-phase AC circuit 110. The AC circuit 110 includes a circuit breaker 112 and a phase reversal switch 114.

The output terminals 108 of the DFIG system 100 are electrically connected to a remote three-phase AC power network or utility grid 128 (hereinafter "remote power network") by means of an external three-phase AC circuit 116. The AC circuit 116 includes a first switchyard 118 to which the output terminals 108 are electrically connected by a step-up transformer 120 and a local (or HV) circuit breaker 122. Additional DFIG systems may be electrically connected to the first switchyard 118 as shown.

The first switchyard 118 is electrically connected to a second switchyard 124 by an AC power line 126. Additional AC power lines may be electrically connected to the second switchyard 124 as shown.

Figure 1:
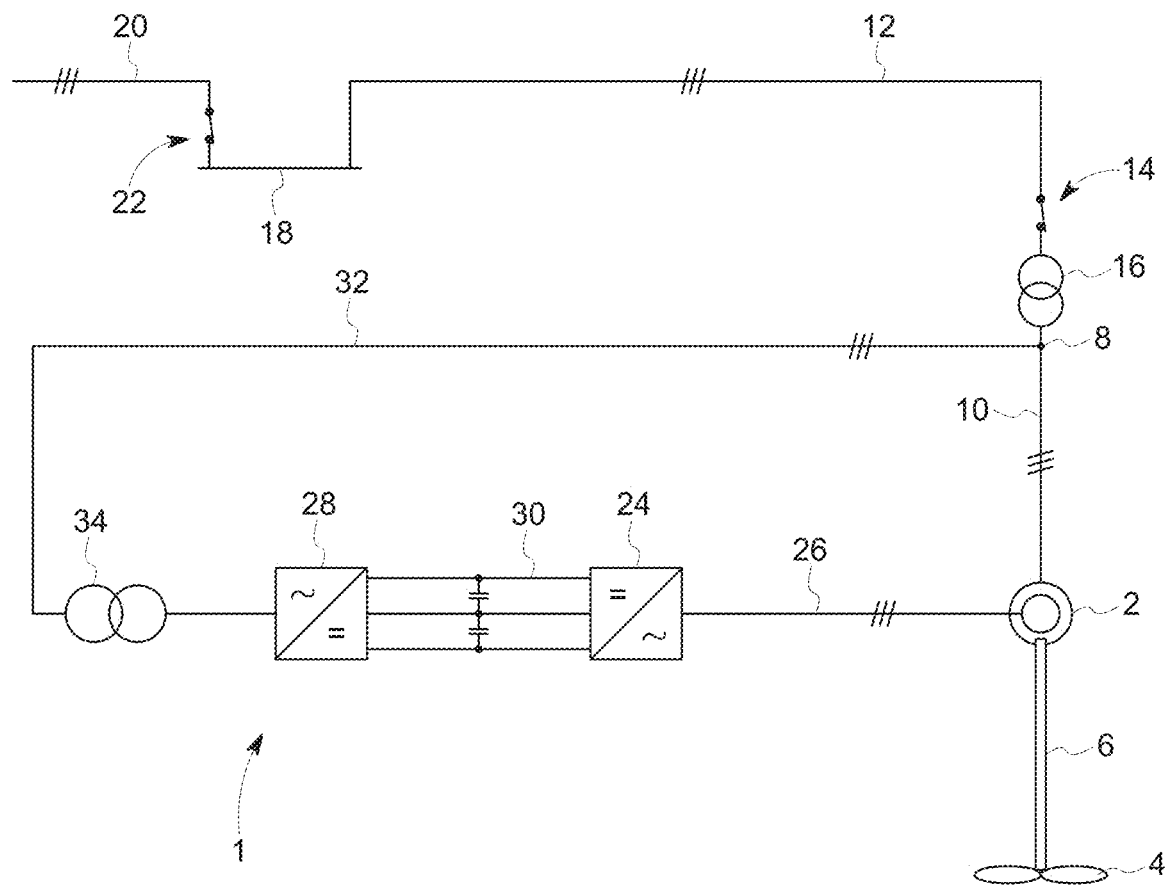
FIG. 1 is a schematic diagram of a basic DFIG system.
Figure 2:
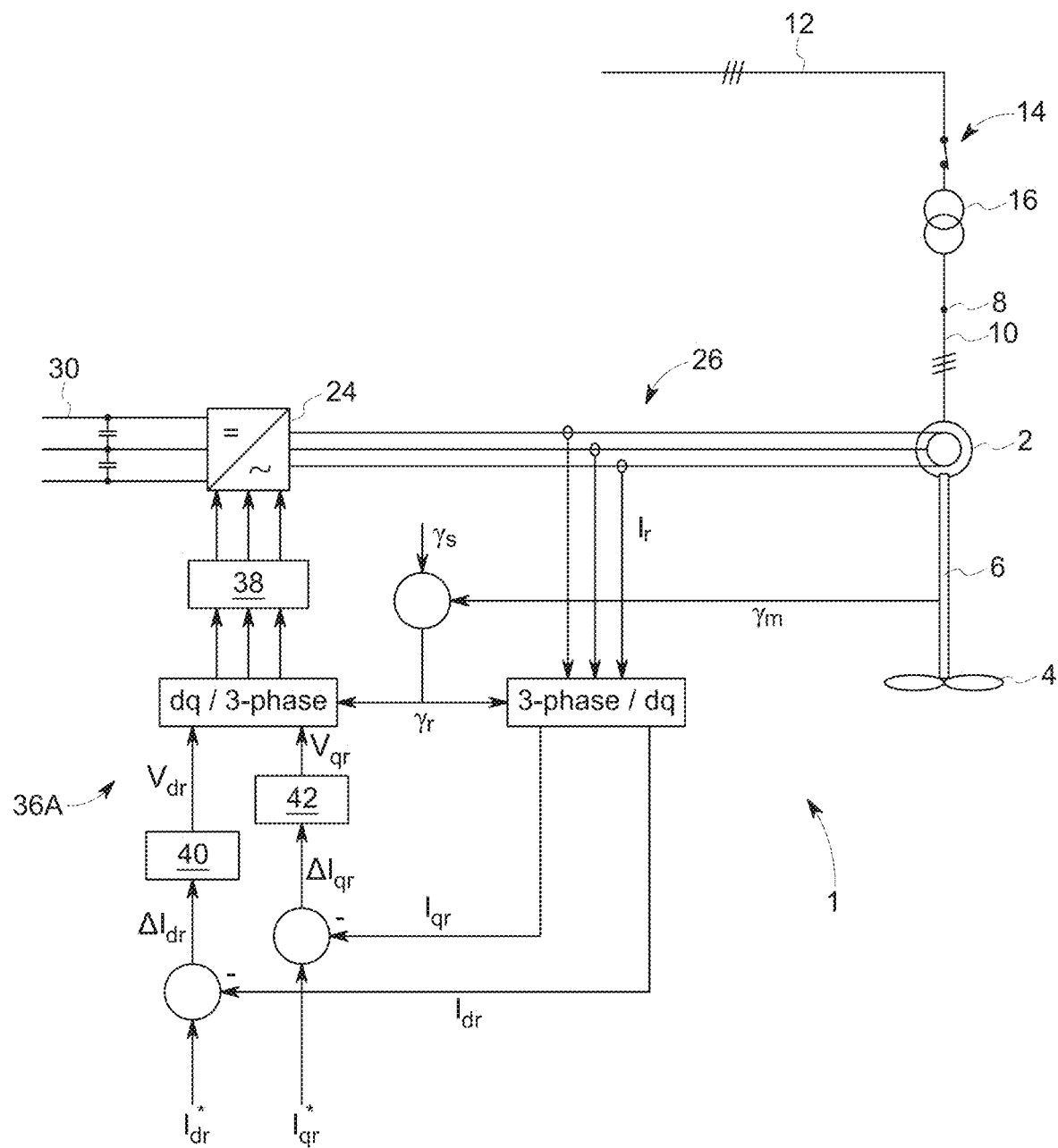
FIG. 2 is a schematic diagram of part of the basic DFIG system of FIG. 1 showing a controller for the machine-side converter.

The AC circuit 116 forms part of a local three-phase AC power network (hereinafter "local power network") that is electrically connected to the remote power network 128 through the second switchyard 124, and in particular by means of a remote circuit breaker 168—see below. In this arrangement, the local power network would extend as far as the second switchyard 124 and possibly to further parts of the remote power network as long as there is no other significant power source with a higher rated power and/or inertia. Any additional DFIG systems electrically connected to the first switchyard 118 may be operated in a "slave mode" where they follow the operation of the DFIG system 100 shown in FIG. 3. Alternatively, any additional DFIG systems may be operated with a known control scheme such as the control scheme described with reference to FIG. 2, for example. As such, any additional DFIG systems may be considered to be local power sources that do not have a higher rated power or inertia.

The second switchyard 124 is electrically connected to the remote power network 128 operating at a fixed grid frequency, e.g., 50 or 60 Hz, when the remote circuit breaker 168 is closed.

The rotor winding of the DFIG 102 is electrically connected to three machine-side converters 130a-130c arranged in parallel by a three-phase AC circuit 132. It will be readily understood that the number of machine-side converters is not limited to three and will depend on the overall system requirements. A crowbar 134 is electrically connected to the AC circuit 132. A grid-side converter 136a-136c is electrically connected to each machine-side converter 130a-130c by a DC link 138a-138c with one or more capacitors. Each DC link 138a-138c includes a DC chopper 140a-140c.

Each grid-side converter 136a-136c is electrically connected to the output terminals 108 by a three-phase AC circuit 142a-142c that includes a transformer 144a-144c. The AC circuits 142a-142c are electrically connected to a circuit breaker 146 that is electrically connected in turn to the output terminals 108 by a three-phase AC circuit 148.

A pre-charge circuit/auxiliary grid 150 is electrically connected to the AC circuit 148 and includes a circuit breaker 152. The pre-charge circuit/auxiliary grid 150 is electrically connected to each DC link 138a-138c by a contactor 154a-154c, a pre-charge transformer 156a-156c and a rectifier 158a-158c. The pre-charge circuit/auxiliary grid 150 includes a transformer 160 and is electrically connected to an electric machine 162 whose rotor shaft is driven by a prime mover, for example a diesel engine 164.

Other electrical loads may be electrically connected to the pre-charge circuit/auxiliary grid 150 as shown.

All circuit breakers (CBs), contactors etc. are controlled to open and close by a controller (not shown).

Figure 4:
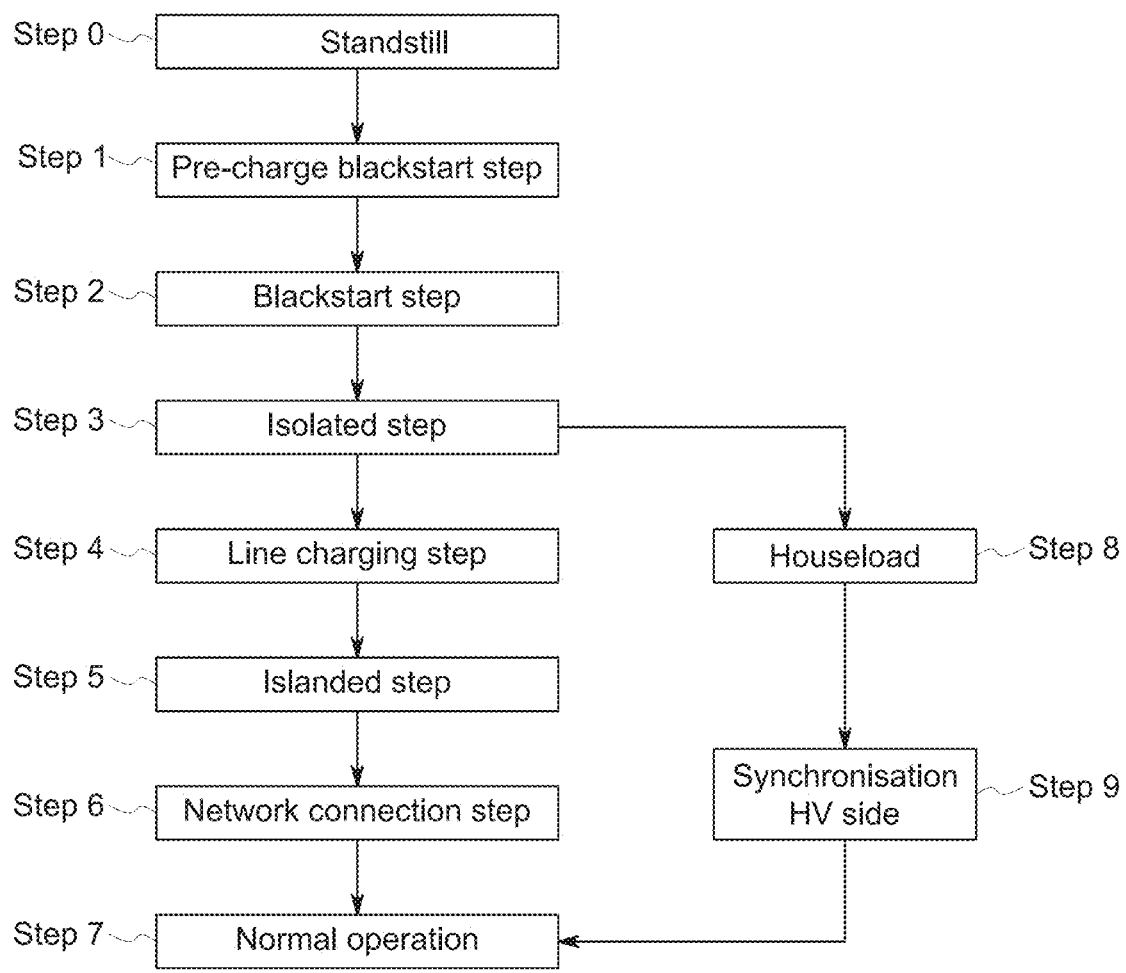
FIG. 4 is a flow diagram of an operating sequence for the DFIG system of FIG. 3.

From standstill (step 0) the DFIG system 100 may be operated in a sequence of steps shown in FIG. 4. The operation sequence will also transition the local power network through various operating modes, and in particular a line-charging mode, an islanded mode, and eventually a grid-connected mode.

Pre-Charge Blackstart Step (Step 1)

Summary: The pre-charge circuit/auxiliary grid 150 receives power from the electric machine 162 and the DC links 138a-138c are charged using the pre-charge circuit/auxiliary grid to an initial DC link voltage.

Blackstart Step (Step 2)

Summary: The excitation of the DFIG 102 is ramped up, until the grid-side converters 136a-136c may be started. After starting the grid-side converters 136a-136c, the DC link voltage is increased from the initial DC link voltage.

Figure 5:
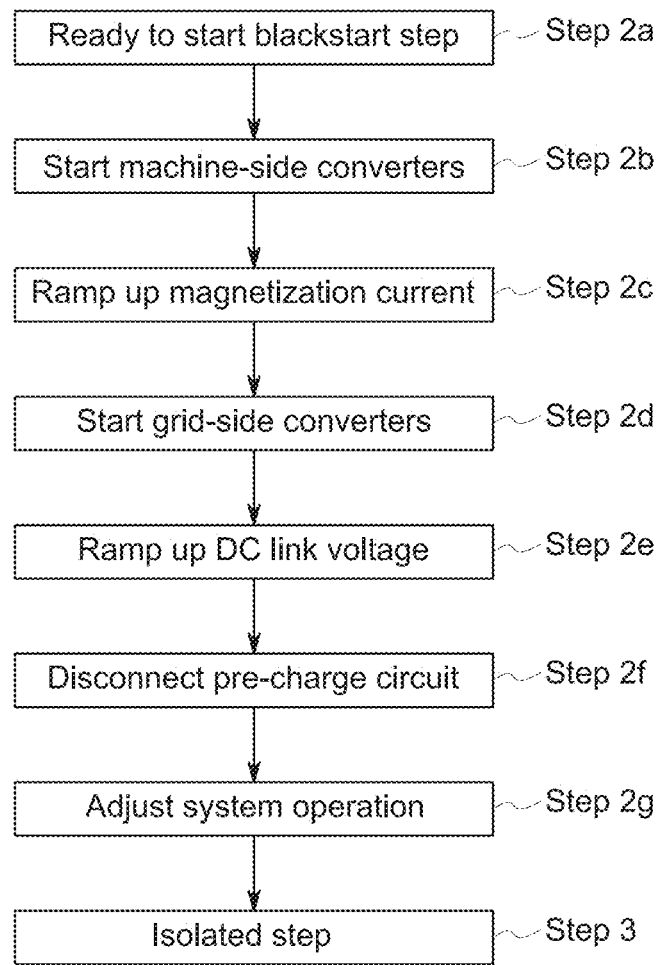
FIG. 5 is a flow diagram of a blackstart step of the operating sequence.
Figure 6:
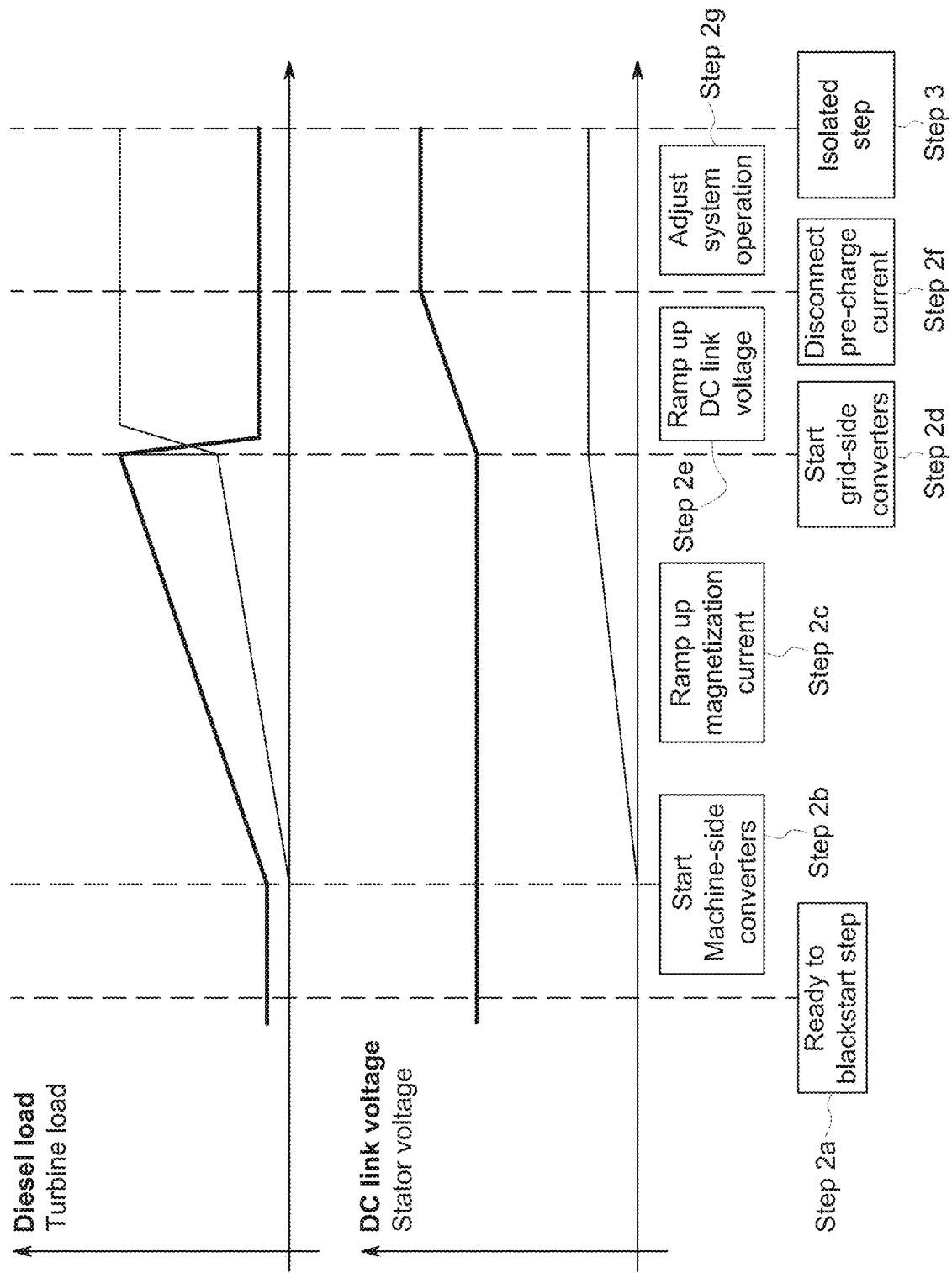
FIG. 6 shows characteristic values of the blackstart step.

The detailed sequence for the blackstart step is shown in FIG. 5. Characteristic values are shown in FIG. 6. In particular, FIG. 6 shows:
the load on the diesel engine 164 that drives the electric machine 162 supplying power to the pre-charge circuit/auxiliary grid 150 (the "diesel load"),
the load on the turbine assembly 104 (the "turbine load"),
the DC link voltage, and
the stator voltage.
Switch state during the blackstart step:
circuit breaker 112 is closed,
phase reversal disconnector 114 is connected to "turbine" (T),
circuit breaker 146 is closed,
local circuit breaker 122 is open,
pre-charge contactors 154a-154c are closed, and
circuit breaker 152 is open.
Control state during the blackstart step:
turbine regulator controls the opening/closing of the wicket gates to control rotor shaft speed,
grid-side converters 136a-136c control DC link voltage, and machine-side converters 130a-130c control rotor current amplitude and frequency.

After the DC links 138a-138c have been pre-charged to the initial DC link voltage in step 1, the blackstart step may be started.

The turbine regulator may bring the rotor shaft speed of the DFIG 102 to close to the synchronous speed. For example, the rotation speed of the turbine assembly 104, and hence the rotation speed of the rotor shaft, may be controlled by operating the wicket gates to control the flow of water to the turbine assembly 104.

The speed setpoint will preferably lead to low slip to minimise the rotor active power.

The machine-side converters 130a-130c are started (step 2b) and inject a magnetisation current into the DFIG 102 to excite it. As a result of the excitation, the stator voltage will increase. Any active current flow on the stator, will apply a torque to the rotor shaft.

During step 2c, the magnetisation current reference is increased by a ramp. When the stator voltage reaches a pre-defined level (e.g., 20% to 32% of the rated stator voltage), the grid-side converters 136a-136c are started (step 2d). The grid-side converter controls the DC link voltage.

The DC link voltage reference is increased by a ramp (step 2e). With increasing DC link voltage from the initial DC link voltage, the active power flow through the pre-charge rectifiers 158a-158c will cease, and instead the active power will start to flow from the stator via the transformers 144a-144c into the DC link.

As it is unloaded, the pre-charge circuit/auxiliary grid 150 may be disconnected from the DC links 138a-138c by opening the pre-charge contactors 154a-154c (step 2f). However, it may be required that the pre-charge contactors 154a-154c remain closed to supply power to the DC links 138a-138c in case of a transient during the following steps, which leads to a decrease in DC link voltage.

With fully ramped up DC link voltage, optimization of the overall DFIG system 100 (e.g., power converter and/or turbine assembly operation) may be carried out (step 2g).

The DFIG system 100 now operates in isolated step (step 3)—see below.

Isolated Step (Step 3)

Summary: The DFIG system 100 is operated in steady state where the rotor shaft speed is controlled by the turbine regulator at de facto no load condition. The machine-side converters 130a-130c are excited by the DFIG 102 to a level in the range of 20% to 32% of rated stator voltage. The grid-side converters 136a-136c control the DC link voltage and cover losses within the electrical system.

Line Charging Step (Step 4)

Summary: The AC power line 126, which was previously not energized, is electrically connected to the DFIG 102 through the step-up transformer 120 by closing the local circuit breaker 122. The power converter is operated to increase the line voltage and to transition the local power network into a line charging mode of operation.

Figure 7:
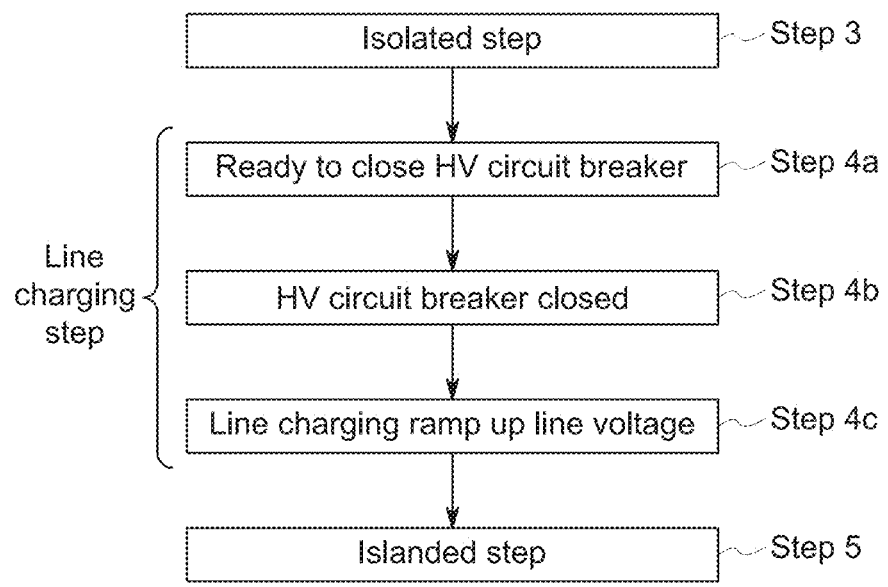
FIG. 7 is a flow diagram of a line charging step of the operating sequence.
Figure 8:
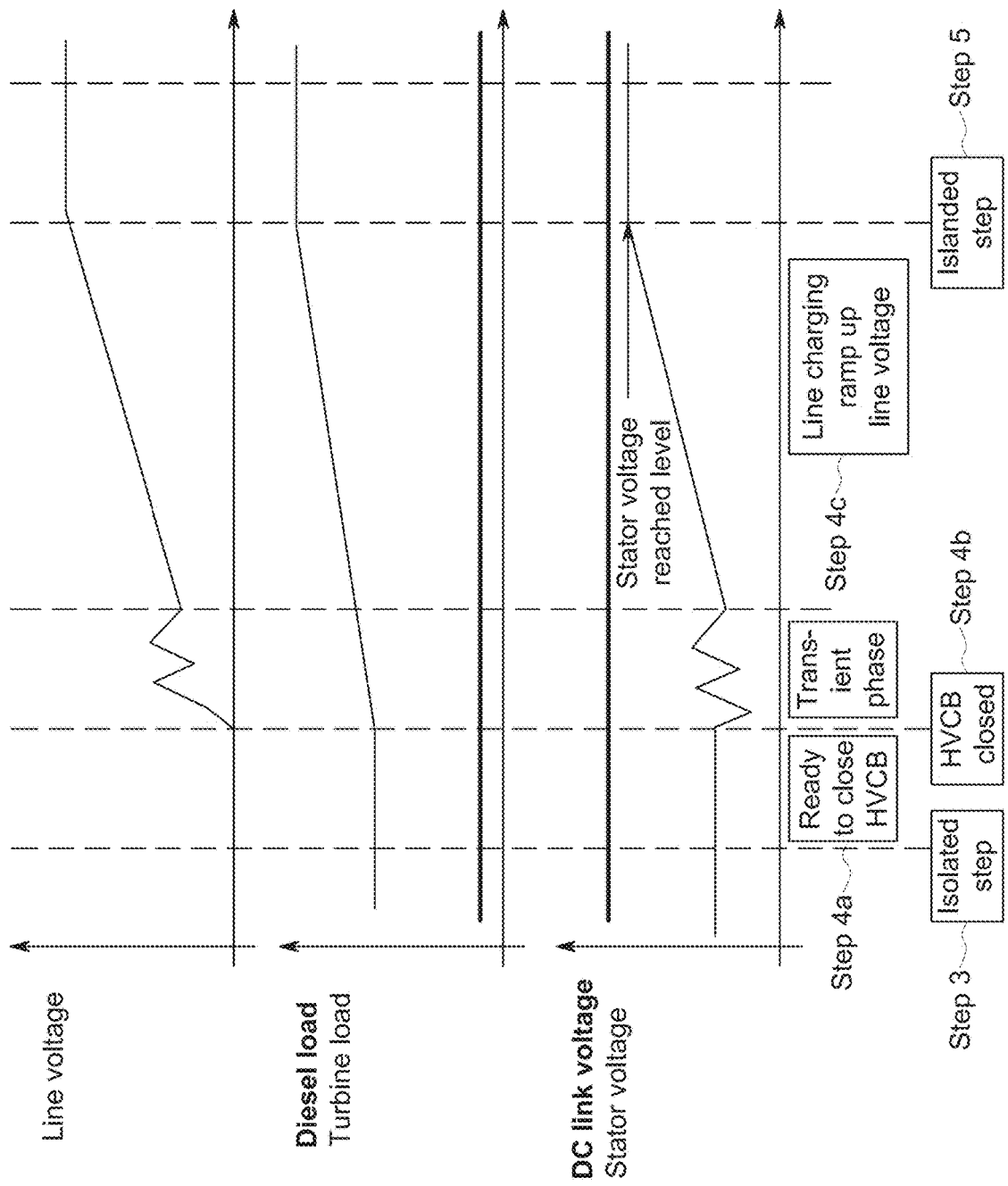
FIG. 8 shows characteristic values of the line charging step.

The detailed sequence for the line charging step is shown in FIG. 7. Characteristic values are shown in FIG. 8. In particular, FIG. 8 shows:
the line voltage,
the load on the diesel engine 164 that drives the electric machine 162 supplying power to the pre-charge circuit/auxiliary grid 150 (the "diesel load"),
the load on the turbine assembly 104 (the "turbine load"),
the DC link voltage, and
the stator voltage.

Switch state during the line charging step:
circuit breaker 112 is closed,
phase reversal disconnector 114 is connected to "turbine" (T),
circuit breaker 146 is closed,
local circuit breaker 122 is open and will be closed during line charging (circuit breakers 166A, 166B that connect the AC power line 126 to the first and second switchyards 118, 124 are closed),
pre-charge contactors 154*a*-154*c* are open or closed, and
circuit breaker 152 is open.
Control state during the line charging step:
turbine regulator controls the opening/closing of the wicket gates to control rotor shaft speed,
grid-side converters 136*a*-136*c* control DC link voltage, and
machine-side converters 130*a*-130*c* control rotor current amplitude and frequency. The first, second or third control schemes described below may be used to control the machine-side converters 130*a*-130*c* during the line charging step and while the local power network is operated in the line charging mode. The second control scheme may be preferred.

The speed setpoint should consider the operational characteristic of the machine-side converters 130*a*-130*c* with preference to medium output voltage and of the turbine assembly 104, which is preferably run at low speed.

The line charging step is initiated (e.g., by a control signal) and preparation is made to close the local circuit breaker 122 (step 4*a*). The circuit breakers 166A, 166B that connect the AC power line 126 to the first and second switchyards 118, 124 are closed. If all necessary internal conditions are fulfilled, the controller (not shown) closes the local circuit breaker 122 to connect the DFIG system to the first switchyard 118 (step 4*b*) and transition the local power network to a line charging mode.

With the closing of the local circuit breaker 122, the AC power line 126 will be electrically connected to the DFIG system 100 and may be energised. Due to the AC power line's capacity against ground, an inrush current is expected which imposes a transient in the DFIG 102 and the power converter. The stator voltage is expected to partially decrease.

After receiving the closed feedback from the local circuit breaker 122, and after the transient due to line connection is over, the power converter starts to increase the stator voltage and at the same time the AC power line voltage (step 4*c*).

With increasing voltage, the losses of the DFIG system will increase and are covered by the turbine assembly 104. For example, the wicket gates opening will be adjusted.

Islanded Step (Step 5)
Summary: The AC power line 126 is charged to a voltage of >90% of rated voltage.

Passive loads may be electrically connected and active power may be consumed up to a pre-defined level. The local power network is operated in an islanded mode. During the islanded mode there is no other significant power source with a higher rated power and/or inertia connected to the local power network. The DFIG system 100 therefore regulates the voltage and frequency of the local power network. Any additional DFIG systems electrically connected to the first switchyard 118 may support the DFIG system 100 and may be operated in a "slave mode", i.e., where the additional DFIG system follow the operation of the DFIG system and may consequently be considered to be an extension of the DFIG system.

The first, second or third control schemes described below may be used to control the machine-side converters 130*a*-130*c* during the islanded step and while the local power network is operated in the islanded mode. The third control scheme may be preferred.

Network Connection Step (Step 6)
Summary: The power converter and the DFIG control prepares the settings for connection of the islanded local power network to the remote power network 128 through the second switchyard 124. This transitions the local power network from the islanded mode to a grid-connected mode (or normal mode).

Figure 9:
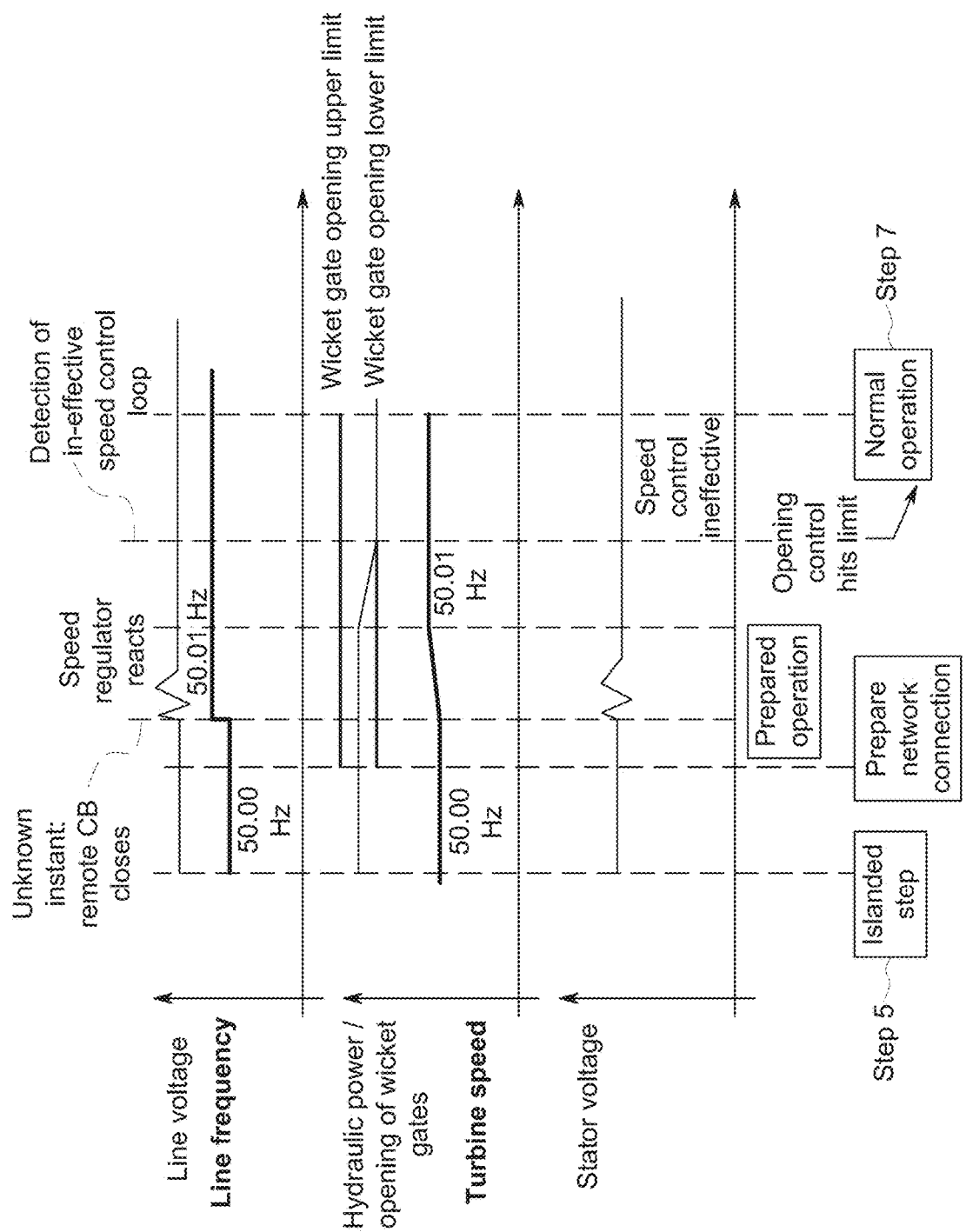
FIG. 9 shows characteristic values of a network connection step of the operating sequence.

Characteristic values for the network connection step are shown in FIG. 9. In particular, FIG. 9 shows:
the line voltage,
the line frequency,
the opening/closing of the wicket gates that control flow of water to the turbine assembly 104 (the "hydraulic power"),
the turbine speed, and
the stator voltage.
Switch state during the network connection step:
circuit breaker 112 is closed,
phase reversal disconnector 114 is connected to "turbine" (T),
circuit breaker 146 is closed,
local circuit breaker 122 is closed (circuit breakers 166A, 166B that connect the AC power line 126 to the first and second switchyards 118, 124 are closed),
pre-charge contactors 154*a*-154*c* are open,
circuit breaker 152 is open,
remote circuit breaker 168 is open and will be closed during the network connection step.
Control state during the network connection step:
turbine regulator controls the opening/closing of the wicket gates to control rotor shaft speed,
grid-side converters 136*a*-136*c* control DC link voltage, and
machine-side converters 130*a*-130*c* control rotor current amplitude and frequency. The first, second or third control schemes described below may be used to control the machine-side converters 130*a*-130*c* during the network connection step as the local power network is transitioned from the islanded mode to the grid-connected mode. The third control scheme may be preferred.

During the network connection step, it is necessary to connect the local power network to the remote power network 128.

It is assumed that:
the remote circuit breaker 168 which connects the remote power network 128 to the second switchyard 124 is physically remote to the DFIG system,
there is no instant signalling to the controller for the power converter,
the difference between the frequency of the DFIG system (i.e., the "stator frequency") and the frequency of the remote power network 128 (the "grid frequency") is very small, and in particular is small enough for a remote synchrocheck to allow the electrical connection to be made by closing the remote circuit breaker 168, and
the installed power in the remote power network 128 is higher than the installed power in the islanded local power network.

This means that the instant of connection by the remote synchrocheck is not known exactly and that, after connection, the stator frequency will be forced to follow the grid frequency (i.e., the frequency of the remote power network).

The turbine regulator (not shown) may control the rotation speed of the turbine assembly 104 (e.g., by operating the wicket gates) to a speed which is pre-defined for islanded operation. This rotation speed should take into consideration the operational characteristic of the power converter with preference to medium output voltage and of the turbine assembly, which is preferably run at low speed.

When it is intended to connect the AC power line 126 to the interconnected remote power network 126, a signal may be sent to the power converter controller and the turbine regulator.

The controller and turbine regulator will apply limits to the active and reactive power, as well as to the wicket gate opening. Transients will be used to detect the remote connection and the DFIG system 100 switches to normal operation (step 7). The local power network is transitioned to a grid-connected mode.

The difference between the stator frequency $\omega_s$ and the grid frequency $\omega_g$ on network connection will result in a change in the rotor shaft speed of the DFIG 102. If the grid frequency is higher than the stator frequency, the rotor shaft speed will increase and the turbine regulator may adjust the wicket gates to reduce rotor shaft speed accordingly. If the grid frequency is lower than the stator frequency, the rotor shaft speed will decrease and the regulator may adjust the wicket gates to increase rotor shaft speed accordingly.

Normal Operation Step (Step 7)

Summary: The DFIG system 100 is electrically connected to the remote power network 128 and operates within normal parameters for hydro power generation.

The local power network operates in a grid-connected mode (or normal mode).

The first, second or third control schemes described below may be used to control the machine-side converters 130a-130c for a short time after the remote circuit breaker 168 is closed and the local power network is transitioned to the grid-connected mode. The third control scheme may be preferred. After a short time (e.g., less than 15 min for a manual transition or less than about 100 ms for an automatic transition) the machine-side converters 130a-130c may be controlled by a known control scheme as described with reference to FIG. 2, for example.

Houseload (Step 8)

Summary: The DFIG system 100 is operated in steady state where the rotor shaft speed is controlled by the turbine regulator at de facto no load condition. The machine-side converters 130a-130c are excited by the DFIG 102 to a level in the range of about 90% of rated stator voltage. The grid-side converters 136a-136c control the DC link voltage and covers losses within the electrical system. The high stator voltage allows connection of the auxiliary grid 150 to the stator.

Synchronisation HV Side (Step 9)

Summary: The DFIG system 100, which was previously operated in the houseload step, is synchronised to the remote power network grid 128.

Figure 10:
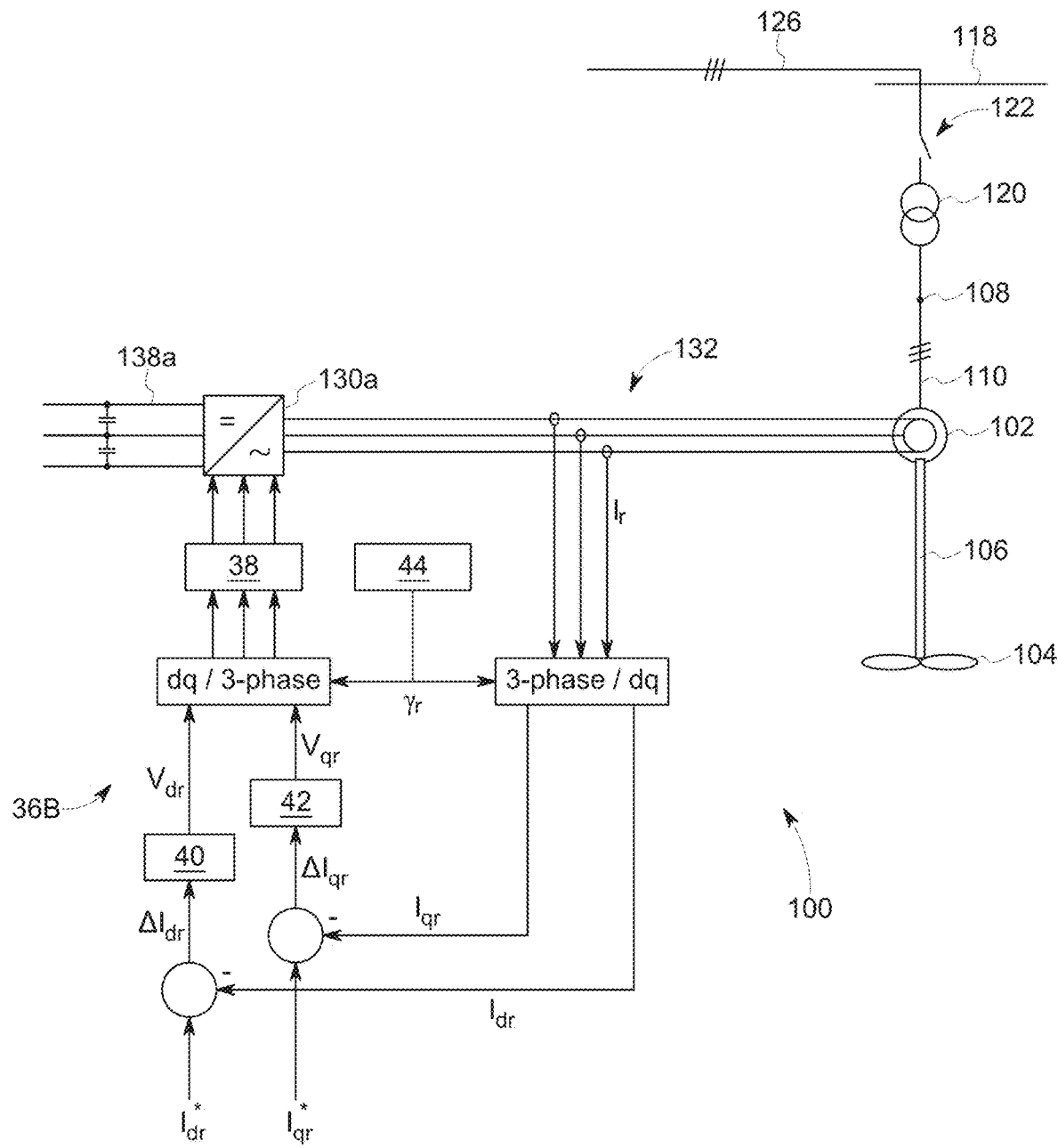
FIG. 10 is a schematic diagram of part of the basic DFIG system of FIG. 1 showing a first controller for the machine-side converter according to the present invention.

FIG. 10 shows a first controller 36B according to the present invention. The controller 36B is similar to the controller 36A shown in FIG. 2 and like parts have been given the same reference sign. The controller 36B may be used to control the machine-side converters 130a-130c of the DFIG system 100 shown in FIG. 3.

Figure 12:
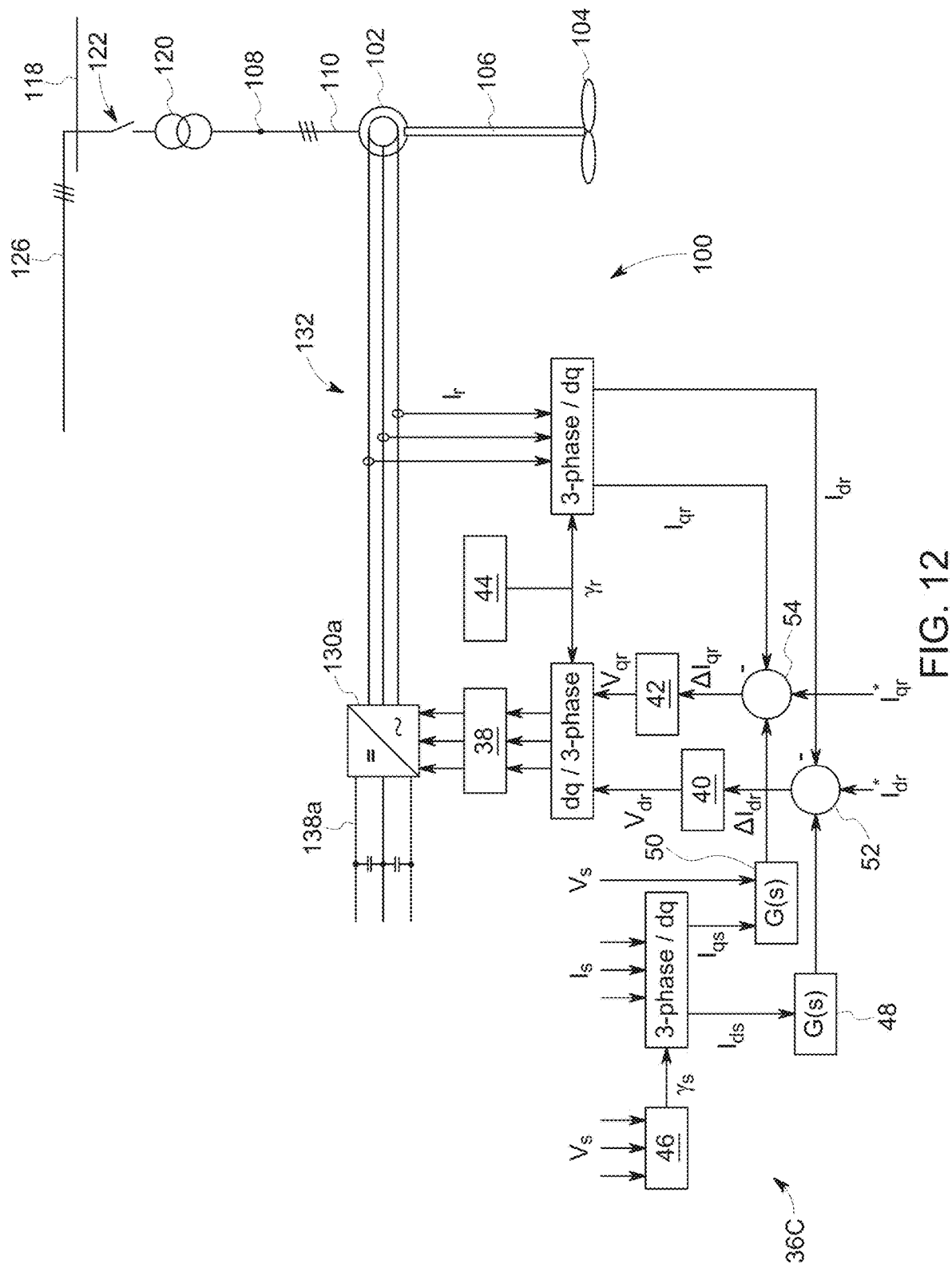
FIG. 12 is a schematic diagram of a second controller for the machine-side converter according to the present invention.
Figure 13:
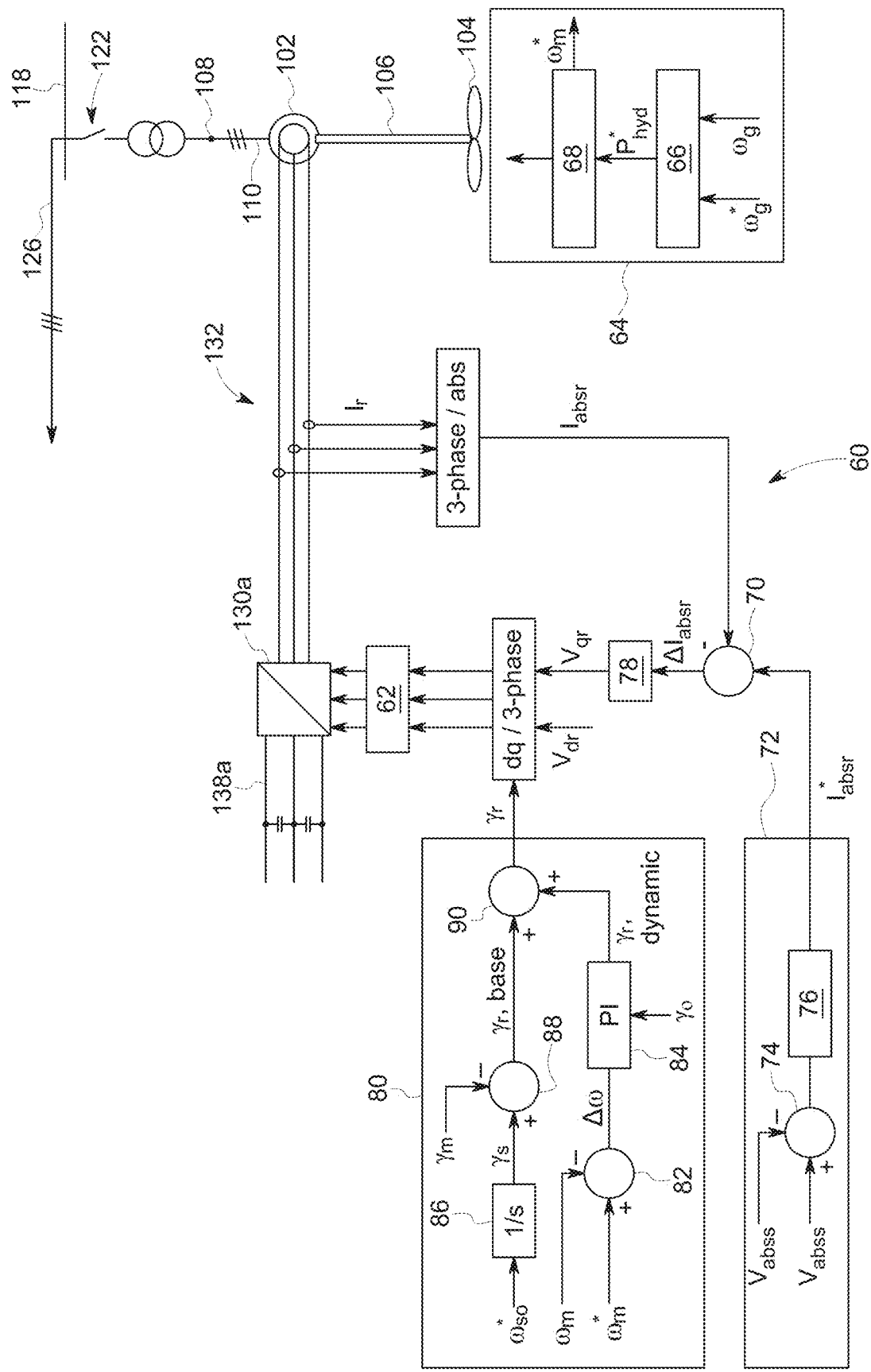
FIG. 13 is a schematic diagram of a third controller for the machine-side converter according to the present invention.

To improve clarity, only one of the machine-side converters is shown in FIGS. 10, 12 and 13. The grid-side converters, the remote switchyard, the remote power network and other non-essential components have also been omitted.

The first controller 36B controls the machine-side converter 130a according to a first control scheme.

The first controller 36B includes a pulse pattern generator 38 for generating drive pulses for controlling the semiconductor switches of the machine-side converter 130a to turn on and off. The drive pulses are generated using output signals from a direct axis (or "d-axis") current controller 40 and a quadrature axis (or "q-axis") current controller 42.

The rotor current $I_r$ may be measured using suitable current transducers or other measuring devices and is converted from the three-phase reference frame to the dq-reference frame based on a transformation angle $\gamma_r$. The dq-reference frame is a rotating reference frame, typically rotating at the stator frequency of the DFIG 102. In the dq-reference frame, the measured value of the rotor current has a d-axis component (or "d-axis rotor current $I_{dr}$") and a q-axis component (or "q-axis rotor current $I_{qr}$").

The d-axis current controller 40 receives an input signal $\Delta I_{dr}$ derived from a difference between a d-axis rotor current reference $I_{dr}*$ and the d-axis rotor current $I_{dr}$. The q-axis current controller 42 receives an input signal $\Delta I_{qr}$ derived from a difference between a q-axis rotor current reference $I_{qr}*$ and the q-axis rotor current $I_{qr}$. The d-axis rotor current reference $I_{dr}*$ may be provided by an active power, torque or speed controller, for example, and may be indicative of a desired active power, torque or speed for the DFIG 102. The d-axis current controller 40 uses the input signal $\Delta I_{dr}$ to derive a d-axis rotor voltage $V_{dr}$ to control the semiconductor switches of the machine-side converter 103a to achieve the desired active power, torque or speed that corresponds to the d-axis rotor current reference $I_{dr}*$. The q-axis rotor current reference $I_{qr}*$ may be provided by a reactive power, voltage or power factor controller, for example, and may be indicative of a desired reactive power, voltage or power factor for the DFIG 102. The q-axis current controller 42 uses the input signal $\Delta I_{qr}$ to derive a q-axis rotor voltage $V_{qr}$ control the semiconductor switches of the machine-side converter 130a to achieve the desired reactive power, voltage or power factor that corresponds to the q-axis rotor current reference $I_{qr}*$.

The d-axis current controller 40 and the q-axis current controller 42 may be proportional-integral (PI) controllers, for example.

The d-axis and q-axis rotor voltages $V_{dr}$, $V_{qr}$ derived by the d-axis and q-axis current controllers 40, 42 are converted from the dq-reference frame to the three-phase reference frame based on the transformation angle $\gamma_r$ and provided as an input to the pulse pattern generator 38.

Figure 11A:
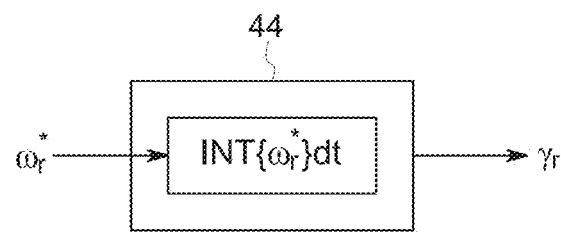
FIG. 11A is a schematic diagram of a first rotor angle generator.

The transformation angle $\gamma_r$ used to convert between the three-phase and dq-reference frames is a rotor angle and is provided by a rotor angle generator 44. Unlike the controller 36A shown in FIG. 2, the rotor angle $\gamma_r$ is not derived from the mechanical angle and the stator angle. Instead, as shown in FIG. 11A, the rotor angle generator 44 may derive the rotor angle $\gamma_r$ by integrating a substantially constant (or pre-set) rotor frequency reference $\omega_r*$ that is indicative of the desired rotor frequency to be maintained at the AC terminals of the machine-side converter 130a as represented below:

$$\gamma_r = INT\{\omega_r*\}dt$$

Figure 11B:
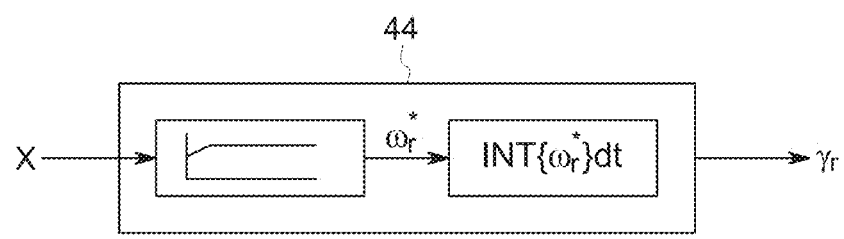
FIG. 11B is a schematic diagram of a second rotor angle generator.

Alternatively, as shown in FIG. 11B, the rotor angle generator 44 may derive the rotor frequency reference $\omega_r^*$ using a look-up table with reference to one or more system parameters such a stator power, grid power, rotor shaft speed etc., and represented in FIG. 11B by "X". The rotor angle generator 44 may then derive the rotor angle $\gamma_r$ by integrating the rotor frequency reference $\omega_r^*$ as represented above.

The first controller 36B uses the rotor angle $\gamma_r$ generated by the rotor angle generator 44 to control the semiconductor switches of the machine-side converter 130a to achieve and maintain the desired rotor frequency during the appropriate operating steps of the DFIG system 100.

FIG. 12 shows a second controller 36C according to the present invention. The second controller 36C is similar to the first controller 36B shown in FIG. 10 and like parts have been given the same reference sign.

The second controller 36B controls the machine-side converter 130a according to a second control scheme.

The d-axis current corresponds to the active current and the q-axis current corresponds to the reactive current only if the rotating reference frame is correctly aligned with the stator voltage. When using a substantially constant rotor frequency to derive a rotor angle as the transformation angle to convert between the three-phase and dq-reference frames, this alignment might be lost in the case of loading the DFIG 2 with active power.

It is known that in the case of correct alignment, the stator current and rotor current have the following relationship:

$$I_{dr} = -\frac{L_s}{L_h}I_{ds} + \frac{L_s}{L_h R_{Fe}}V_{ds} - \frac{R_s}{L_h \omega_s}I_{qs}$$

$$I_{qr} = -\frac{L_s}{L_h}I_{qs} - \frac{V_{ds}}{L_h \omega_s} + \frac{R_s}{L_h \omega_s}I_{ds}$$

where:
$I_{dr}$ is the d-axis rotor current,
$I_{qr}$ is the q-axis rotor current,
$I_{ds}$ is the d-axis stator current,
$I_{qs}$ is the q-axis stator current,
$L_s$ is the stator inductance,
$L_h$ is the main inductance,
$R_{Fe}$ is the iron resistance,
$V_{ds}$ is the d-axis stator voltage,
$R_s$ is the stator resistance, and
$\omega_s$ is the stator angular frequency.

This alignment may be corrected on the basis of the relationship between the stator current $I_s$ and the rotor current $I_r$.

As shown in FIG. 12, the second controller 36C includes a stator angle generator 46 that derives a stator angle $\gamma_s$ from a measured value of the stator voltage $V_s$ using a PLL, for example. The stator current $I_s$ may be measured using suitable current transducers or other measuring devices and is converted from the three-phase reference frame to the dq-reference frame based on the stator angle $\gamma_s$. In the dq-reference frame, the measured value of the stator current has a d-axis component (or "d-axis stator current $I_{ds}$") and a q-axis component (or "q-axis stator current $I_{qs}$"). The d-axis stator current $I_{ds}$ is provided to a gain function 48 and then to the summing node 52 that provides the input signal $\Delta I_{dr}$ to the d-axis current controller 40. The q-axis stator current $I_{qs}$ is provided to a gain function 50 and then to the summing node 54 that provides the input signal $\Delta I_{qr}$ to the q-axis current controller 42. The gain function 50 also receives the measured stator voltage $V_s$.

In case the measured d-axis and q-axis rotor currents $I_{dr}$ and $I_{qr}$ do not fulfil the above relationship with the respective d-axis and q-axis stator currents $I_{ds}$ and $I_{qs}$, the gain functions, 48, 50 are implemented to correct for the d-axis and q-axis currents, respectively. The gain functions 48, 50 may be implemented as a constant gain value, a first order transfer function such as a low pass function, or a PID function, for example.

In one particular implementation, the gain function 48 may be represented by:

$$-\frac{L_s}{L_h}$$

and the gain function 50 may be zero.

The second controller 36C may align the rotor d-axis with the stator d-axis. Conventionally, d-axis control is associated with active power and the q-axis control is associated with reactive power. The stator voltage measurement is needed to distinguish between active and reactive power current components.

FIG. 13 shows a third controller 60 according to the present invention.

The third controller 60 controls the machine-side converter 130a according to a third control scheme.

The controller 60 includes a pulse pattern generator 62 for generating drive pulses for controlling the semiconductor switches of the machine-side converter 130a to turn on and off.

A turbine regulator 64 includes a grid frequency controller 66 that derives power reference $P_{hyd}^*$ by comparing a measured grid frequency $\omega_g$ (e.g., the frequency of the local power network when operated in an islanded mode before it is electrically connected to the remote power network or immediately after a connection has been made and the local power network is operated in a grid-connected mode) with a grid frequency reference $\omega_g^*$. The power reference $P_{hyd}^*$ is provided to a power controller 68 which may adjust the flow of water to the turbine assembly 4 by controlling the wicket gates. The power controller 68 may also use the power reference $P_{hyd}^*$ as the pointer to a look-up table to derive an optimum mechanical speed reference $\omega_m^*$.

The rotor current $I_r$ may be measured using suitable current transducers or other measuring devices and is converted from the three-phase reference frame to an absolute value of the rotor current $I_{absr}$. In particular, the rotor current $I_r$ may be converted using the following equations:

$$I_{\alpha r} = I_{ar}$$

$$I_{\beta r} = \frac{(I_{br} - I_{cr})}{\sqrt{3}}$$

$$I_{absr} = \sqrt{I_{\alpha r}^2 + I_{\beta r}^2}$$

where $I_{ar}$, $I_{br}$ and $I_{cr}$ are the rotor currents for phase "a", "b" and "c", respectively.

Similarly, the stator voltage $V_s$ may be measured using suitable voltage sensors or other measuring devices and is converted from the three-phase reference frame to an absolute value of the stator voltage $V_{abss}$. In particular, the stator voltage $V_s$ may be converted using the following equations:

$$V_{as} = V_{as}$$
$$V_{\beta s} = \frac{(V_{bs} - V_{cs})}{\sqrt{3}}$$
$$V_{abss} = \sqrt{V_{as}^2 + V_{\beta s}^2}$$

where $V_{as}$, $V_{bs}$ and $V_{cs}$ are the stator voltages for phase "a", "b" and "c", respectively.

The absolute value of the rotor current $I_{absr}$ is provided to a summing node 70 where it is subtracted from a rotor current reference $I_{absr}*$.

The rotor current reference $I_{absr}*$ is derived from a stator voltage amplitude controller 72. The stator voltage amplitude controller 72 subtracts the absolute value of the stator voltage $V_{abss}$ from a stator voltage reference $V_{abss}*$ using a summing node 74. The difference between the stator voltage reference $V_{abss}*$ and the absolute value of the stator voltage $V_{abss}$ is provided to a controller 76 which derives the rotor current reference $I_{absr}*$. The controller 76 controls the stator voltage amplitude and may be a PI controller or another suitable controller.

The difference between the rotor current reference $I_{absr}*$ and the absolute value of the rotor current $I_{absr}$ (i.e., $\Delta I_{absr}$ output by the summing node 70) is provided to a q-axis current controller 78 which derives a q-axis rotor voltage $V_{qr}$. The q-axis current controller 78 controls the rotor voltage amplitude and may be a PI controller or another suitable controller. In this arrangement, a d-axis rotor voltage $V_{dr}$ is zero.

The controller 60 includes a rotor angle generator 80 which derives a rotor angle which is used as a transformation angle $\gamma_r$ to convert the q-axis rotor voltage $V_{qr}$ into the three-phase reference frame for use by the pulse pattern generator 62.

In the rotor angle generator 80, a measured value of the mechanical shaft speed $\omega$ is subtracted from the optimum mechanical speed reference $\omega_m*$ provided by the turbine regulator 64 in a summing node 86. (In an alternative arrangement, the optimum mechanical speed reference $\omega_m*$ may simply be a constant value as opposed to being provided by the turbine speed controller. In this case, there would be no need for the turbine speed controller to derive the mechanical speed reference.) The difference between the speed reference $\omega_m*$ and the measured shaft speed $\omega_m$ (i.e., $\Delta\omega$) is provided to a speed controller 84 which provides an output to a summing node 90. The speed controller 84 may be a PI controller or other suitable controller. The output of the speed controller 84 represents a dynamic component of the rotor angle.

An initial stator frequency reference $\omega_{s0}*$ is integrated by integrator 86 to derive a stator angle $\gamma_s$. The mechanical angle $\gamma_m$ may be derived from a speed encoder fitted to the rotor shaft and is subtracted from the stator angle $\gamma_s$ in summing node 88 to derive a base component of the rotor angle. A summing node 90 sums the dynamic and base components of the rotor angle (i.e., $\gamma_r$,dynamic and $\gamma_r$,base) to derive the total rotor angle $\gamma_r$. The rotor angle $\gamma_r$ generated by the rotor angle generator 80 is used by the controller 60 to control the semiconductor switches of the machine-side converter 103a to maintain a substantially constant rotor frequency.

The controller 60 aims to apply the same control scheme for connection to different types of AC power network or utility grid. During a line charging mode of the local power network, the DFIG 102 is effectively creating the islanded network and impregnating the voltage and frequency to the local power network and eventually to other loads that are electrically connected to it. These loads may be passive loads, active loads, or additional generators in the case of a small islanded grid that would typically have small grid inertia (i.e., reaction of grid frequency to active power changes). The dynamic of the remote power network 128 to which the DFIG system 100 is eventually connected is unknown and a robust control structure is needed. At the end of the line charging, the local power network will be electrically connected to the unknown remote power network 128 with an unknown inertia by closing the remote circuit breaker. The control scheme should remain stable during the connection to the remote power network.

The rotor angle generator 80 is initialised by the initial stator frequency reference $\omega_{s0}*$. If the speed reference $\omega_m*$ is the same as the measured speed $\omega_m$, the initial stator frequency reference $\omega_{s0}*$ is integrated to generate the stator angle $\gamma_s$. The integrator 86 may be initialised by an initialising angle. A deviation between the measured speed $\omega_m$ and the speed reference $\omega_m*$ will lead to a change in the stator frequency. This deviation will be detected and corrected by the turbine regulator 64 in terms of a change in the measured grid frequency $\omega_g$, which is the same as the stator frequency. The speed controller 84 will correct for any deviation in the shaft speed. Such speed deviations may happen when a new participant has been electrically connected to the local power network, for example, after the local power network has been electrically connected to the remote power network that has a strong dynamic influence.

Whenever there is a transient in the power network that imposes a higher (or lower) torque on the DFIG 102, the shaft speed will change from the previously steady state. This will cause a reaction in the rotor angle generator 80 which may regulate the stator frequency to a higher or lower value. The turbine regulator 64 will detect the deviation in the stator frequency (which corresponds to the measured grid frequency $\omega_g$) and will use the generated power reference $P_{hyd}*$ to adjust the flow of water to the turbine assembly 104 by controlling the wicket gates to compensate for the higher or lower torque. The rotor frequency also remains substantially constant. The DFIG 102 therefore shows a similar frequency behaviour to a synchronous machine.

The invention claimed is:

1. A method of operating a doubly-fed induction generator DFIG system comprising an induction electric machine including a stator having a stator winding and a rotor having a rotor winding, wherein the stator winding is electrically connected to at least one output terminal of the DFIG system and the rotor winding is electrically connected to the at least one output terminal by means of:

a power converter including a first active rectifier/inverter with first alternating current AC terminals electrically connected to the rotor winding, and direct current DC terminals;

a controller including a rotor angle generator electrically connected to the rotor windings and configured to output control signals including a rotor angle to the first active rectifier/inverter for control thereof; and a second active rectifier/inverter within the power converter having DC terminals electrically connected to the DC terminals of the first active rectifier/inverter by a DC link, and second AC terminals electrically connected to the at least one output terminal;

the method comprising, deriving a rotor angle from a pre-set rotor frequency reference value using the rotor angle generator; and controlling the first active rectifier/inverter via the control signals including using the derived rotor angle as a transformation angle, and wherein the pre-set rotor frequency reference value is indicative of a desired rotor frequency at the first AC terminal, the control signals facilitating keeping a frequency of an AC current corresponding to the desired rotor frequency substantially constant during at least one of a line charging mode and an islanded mode.

2. The method according to claim 1, wherein a frequency of an AC current at the second AC terminals varies during the at least one of the line charging mode and the islanded mode.

3. The method according to claim 1, further comprising converting between a three-phase reference frame and a rotating reference frame based on the rotor angle that is derived by the rotor angle generator.

4. The method according to claim 1, wherein controlling the first active rectifier/inverter further comprises vector control, and the controlling the first active rectifier/inverter further comprises generating drive pulses for controlling semiconductor switches of the first active rectifier/inverter using output signals from at least one axis controller, wherein each axis controller receives an input signal derived from a difference between a respective axis current reference and a respective axis measured rotor current.

5. The method according to claim 4, wherein the input signal to each axis controller is further derived from a respective axis measured stator current in the rotating reference frame, and optionally from a measured stator voltage in the three-phase reference frame.

6. The method according to claim 5, wherein each respective axis measured stator current is modified by a respective controller or gain function.

7. The method according to claim 5, wherein the respective axis measured stator current is provide to a transfer function to derive a setpoint that aligns the respective axis measured rotor current with the respective axis current reference to maintain alignment of the rotating reference frame with the stator voltage.

8. The method according to claim 1, wherein using the rotor generator, the rotor angle is derived from an algorithm that uses a measured value of the rotor shaft speed.

9. The method according to claim 1, wherein the rotor angle is derived using the controller that receives an input signal that is derived from the difference between a rotor shaft speed reference and the measured value of the rotor shaft speed.

10. The method according to claim 9, wherein the speed reference is provided by a speed regulator that regulates the rotor shaft speed of the DFIG.

11. The method according to claim 9, wherein the output of the controller is a dynamic rotor angle that is added to a base rotor angle that is derived from a stator angle and a mechanical angle.

12. The method according to claim 1, wherein the step of controlling the first active rectifier/inverter further comprises using an algorithm to select the frequency of the AC current at its rotor terminals so that the induction electric machine behaves like a synchronous electric machine.

13. The method according to claim 4, wherein the vector control comprises two-axis vector control in a rotating reference frame.

14. The method according to claim 13, wherein the rotating reference frame is a dq-reference frame.

15. The method according to claim 9, wherein the controller is a proportional-integral controller.

16. A doubly-fed induction generator DFIG system comprising:

an induction electric machine including a stator having a stator winding and a rotor having a rotor winding, wherein the stator winding is electrically connected to at least one output terminal of the DFIG system and the rotor winding is electrically connected to the at least one output terminal by means of a power converter that includes:

a first active rectifier/inverter with alternating current AC terminals electrically connected to the rotor winding, and direct current DC terminals;

a second active rectifier/inverter with DC terminals electrically connected to the DC terminals of the first active rectifier/inverter by a DC link, and AC terminals electrically connected to the at least one output terminal; and a controller including a rotor angle generator configured to (i) output control signals including a rotor angle derived from a pre-set rotor frequency reference value using the rotor angle generator and (ii) use the rotor angle as a transformation angle to control the first active rectifier/inverter so that the frequency of the AC current at its AC terminals is kept substantially constant during at least one of a line charging mode and an islanded mode.

17. The local AC power network comprising a DFIG system according to claim 16 and an AC external circuit electrically connected to the at least one output terminal of the DFIG system and electrically connectable to a remote AC power network by means of a remote circuit breaker, the AC external circuit including a local circuit breaker and an AC power line that is electrically connected between the local circuit breaker and the remote circuit breaker.

18. The doubly-fed induction generator DFIG system according to claim 16, wherein the pre-set rotor frequency reference value is indicative of a desired rotor frequency at the first AC terminal.

\* \* \* \* \*